(12) United States Patent
Shikina et al.

(10) Patent No.: US 10,377,038 B2
(45) Date of Patent: Aug. 13, 2019

(54) ROBOT CONTROLLER AND ROBOT CONTROL METHOD

(71) Applicant: KABUSHIKI KAISHA YASAKAWA DENKI, Kitakyushu-shi (JP)

(72) Inventors: Taku Shikina, Kitakyushu (JP);
Takashi Nishimura, Kitakyushu (JP);
Tamio Nakamura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 181 days.

(21) Appl. No.: 15/458,994

(22) Filed: Mar. 15, 2017

(65) Prior Publication Data

US 2017/0266809 A1    Sep. 21, 2017

(30) Foreign Application Priority Data

Mar. 17, 2016 (JP) ................. 2016-054031

(51) Int. Cl.
*B25J 9/16*   (2006.01)

(52) U.S. Cl.
CPC ............ *B25J 9/1651* (2013.01); *B25J 9/161* (2013.01); *B25J 9/1607* (2013.01); *B25J 9/1694* (2013.01); *G05B 2219/40333* (2013.01)

(58) Field of Classification Search
CPC ........ B25J 9/1651; B25J 9/1607; B25J 9/161; B25J 9/1694; G05B 2219/40333
USPC ................................. 700/245, 257
See application file for complete search history.

(56) References Cited

U.S. PATENT DOCUMENTS

| 5,159,249 A | 10/1992 | Megherbi |
| 5,590,034 A | 12/1996 | Snell |
| 6,181,983 B1 * | 1/2001 | Schlemmer ............ B25J 9/1607 |
| | | 318/568.11 |

(Continued)

FOREIGN PATENT DOCUMENTS

| DE | 19800552 C2 | 4/1999 |
| DE | 102015004475 | 10/2015 |

(Continued)

OTHER PUBLICATIONS

Japanese Office Action for corresponding JP Application No. 2016-054031, dated Feb. 5, 2019 (w/ English machine translation).

(Continued)

*Primary Examiner* — Jaime Figueroa
(74) *Attorney, Agent, or Firm* — Mori & Ward, LLP

(57) ABSTRACT

A robot controller (2) configured to control a robot (1) including a plurality of joints ($J_1$-$J_6$) each rotatable around a rotation axis, the robot controller (2) including: an acquisition unit (21) configured to acquire a rotation angle of each of the plurality of joints ($J_1$-$J_6$); a determination unit (22) configured to determine whether or not the robot (1) has been in proximity to a singular configuration, based on the rotation angle of each of the plurality of joints ($J_1$-$J_6$); and a control unit (23) configured to control the plurality of joints ($J_1$-$J_6$) to be rotated not to rotate simultaneously, when the determination unit (22) determines that the robot (1) has been in proximity to the singular configuration.

10 Claims, 5 Drawing Sheets

(56) References Cited

U.S. PATENT DOCUMENTS

| | | | | |
|---|---|---|---|---|
| 6,204,619 | B1* | 3/2001 | Gu | B66C 23/005 254/1 |
| 6,317,651 | B1* | 11/2001 | Gerstenberger | B25J 9/1664 700/245 |
| 6,456,901 | B1* | 9/2002 | Xi | B25J 9/1607 318/568.17 |
| 6,477,448 | B1* | 11/2002 | Maruyama | B25J 13/02 700/302 |
| 8,600,554 | B2* | 12/2013 | Jing | B25J 9/1664 700/245 |
| 9,120,222 | B2* | 9/2015 | Grygorowicz | B25J 1/02 |
| 9,623,567 | B2 | 4/2017 | Iwatake | |
| 9,662,790 | B2* | 5/2017 | Iwatake | G01L 5/0038 |
| 2003/0135303 | A1* | 7/2003 | Arai | B25J 9/1679 700/245 |
| 2003/0171847 | A1 | 9/2003 | Cheng et al. | |
| 2007/0255454 | A1* | 11/2007 | Dariush | G06N 3/008 700/245 |
| 2008/0294285 | A1* | 11/2008 | Shoham | B25J 9/1623 700/245 |
| 2011/0106305 | A1* | 5/2011 | Brethe | B25J 9/1015 700/245 |
| 2013/0268120 | A1* | 10/2013 | Grygorowicz | B25J 1/02 700/264 |
| 2014/0074289 | A1* | 3/2014 | Xiao | B25J 9/163 700/254 |
| 2015/0051732 | A1* | 2/2015 | Grygorowicz | B25J 1/02 700/257 |
| 2015/0290798 | A1* | 10/2015 | Iwatake | B25J 9/0081 700/257 |

FOREIGN PATENT DOCUMENTS

| | | |
|---|---|---|
| EP | 2684649 | 1/2014 |
| JP | 2001-038664 | 2/2001 |
| JP | 2015-511544 | 4/2015 |
| JP | 2015-202536 | 11/2015 |

OTHER PUBLICATIONS

German Office Action for corresponding DE Application No. 10 2017 204 211.7, dated Apr. 5, 2019.

* cited by examiner

ROBOT CONTROLLER AND ROBOT CONTROL METHOD

INCORPORATION BY REFERENCE

The present disclosure contains subject matter related to that disclosed in Japanese Priority Patent Application JP 2016-054031 filed in the Japan Patent Office on Mar. 17, 2016, the entire contents of which are hereby incorporated by reference.

BACKGROUND

Technical Field

The present disclosure relates to a robot controller and a robot control method.

Related Art

Conventionally, a technique of controlling a robot that performs work in cooperation with a human, has been known (refer to Japanese Patent Application National Publication (Laid-Open) No. 2015-511544).

In requirements for a robot that performs work in cooperation with a human, based on ISO 10218-1, ensuring that power generated at the tool center point (TCP) of the robot is a designated value (e.g., 150 N) or less, is required.

Here, a robot controller that controls the robot, calculates the power generated at the tool center point of the robot, based on torque at the rotation axis of each joint.

However, the robot controller cannot calculate the power generated at the tool center point of the robot in a case where the robot has been in a singular configuration (namely, at a singularity of the robot). Specifically, as illustrated in FIG. 6, when joints J2 and J3 of the robot rotate so that a state indicated with a broken line in FIG. 6 is changed to a state indicated with a solid line in FIG. 6, the tool center point of the robot operates in direction D. However, the robot controller cannot calculate the power, in operation direction Dx, generated at the tool center point in a case where the robot has been in the singular configuration.

As a result, there is a problem that ensuring that the power generated at the tool center point is the designated value or less cannot be made.

SUMMARY

Therefore, the present disclosure has been made in consideration of the above problem, and an object of the present disclosure is to provide a robot controller and a robot control method, capable of ensuring that power in an operation direction generated at the tool center point of a robot is a designated value or less, even in a case where the robot has been in proximity to a singular configuration.

The first aspect of the present disclosure is summarized as a robot controller configured to control a robot including a plurality of joints each rotatable around a rotation axis, the robot controller including: an acquisition unit configured to acquire a rotation angle of each of the plurality of joints; a determination unit configured to determine whether or not the robot has been in proximity to a singular configuration, based on the rotation angle of each of the plurality of joints; and a control unit configured to control the plurality of joints to be rotated not to rotate simultaneously, when the determination unit determines that the robot has been in proximity to the singular configuration.

The second aspect of the present disclosure is summarized as a robot control method of controlling a robot having a plurality of joints each rotatable around a rotation axis, the robot control method including: acquiring a rotation angle of each of the plurality of joints; determining whether or not the robot has been in proximity to a singular configuration, based on the rotation angle of each of the plurality of joints; and controlling the plurality of joints to be rotated not to rotate simultaneously, when the determining determines that the robot has been in proximity to the singular configuration.

DESCRIPTION OF THE EMBODIMENTS

Figure 1:
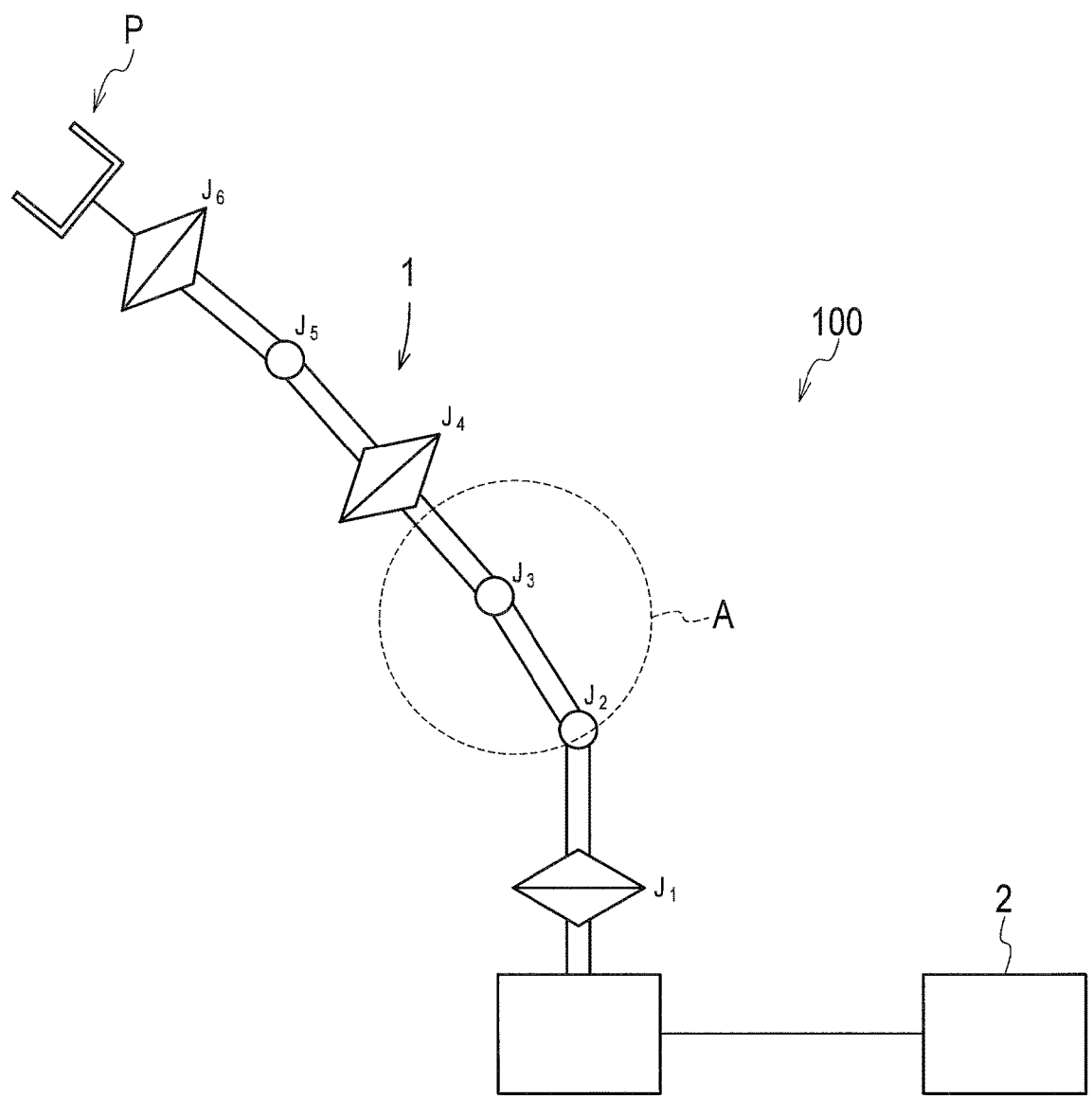
FIG. 1 is a view of an exemplary robot system according to an embodiment.

One embodiment will be described below with reference to FIGS. 1 to 5. As illustrated in FIG. 1, a robot system 100 according to the present embodiment includes a robot 1 and a robot controller 2 configured to control the robot 1.

According to the present embodiment, the robot 1 includes an arm having a plurality of joints $J_1$ to $J_6$. The plurality of joints $J_1$ to $J_6$ is configured to be capable of rotating around rotation axes thereof (not illustrated).

Note that, according to the present embodiment, the robot 1 is premised on performing work in cooperation with a human so that the robot controller 2 controls power generated at tool center point P of the robot 1, to be a designated value (e.g., 150 N) or less, as described above. Here, according to the present embodiment, the tool center point P of the robot 1 is a representative point of a tool fitted to a leading end of the arm of the robot 1.

According to the present embodiment, as illustrated in FIG. 1, a multiaxial robot including the arm having the joints $J_1$ to $J_6$ is exemplified as the robot 1, but the number of the joints (namely, the rotation axes) is not limited to six. For example, the robot 1 may be a multiaxial robot including an arm having seven units or more of the joints (namely, the rotation axes), or a multiaxial robot including an arm having two to five units of the joints (namely, the rotation axes). According to the present embodiment, as illustrated in FIG. 1, a single-arm robot is exemplified as the robot 1, but the robot 1 may be a multi-arm robot having two or more arms.

In a case where the robot 1 has been in a singular configuration (namely, at a singularity of the robot 1), the robot controller 2 cannot calculate the power in operation direction Dx generated at the tool center point P of the robot 1.

Here, a state where the robot 1 has been in the singular configuration (at the singularity of the robot 1) means that the solution of inverse kinematics calculation is not acquired in the robot 1. The inverse kinematics calculation means that the position and the angle of each of the joints $J_1$ to $J_6$ are calculated based on an operation at the tool center point P of the robot 1.

Figure 2:
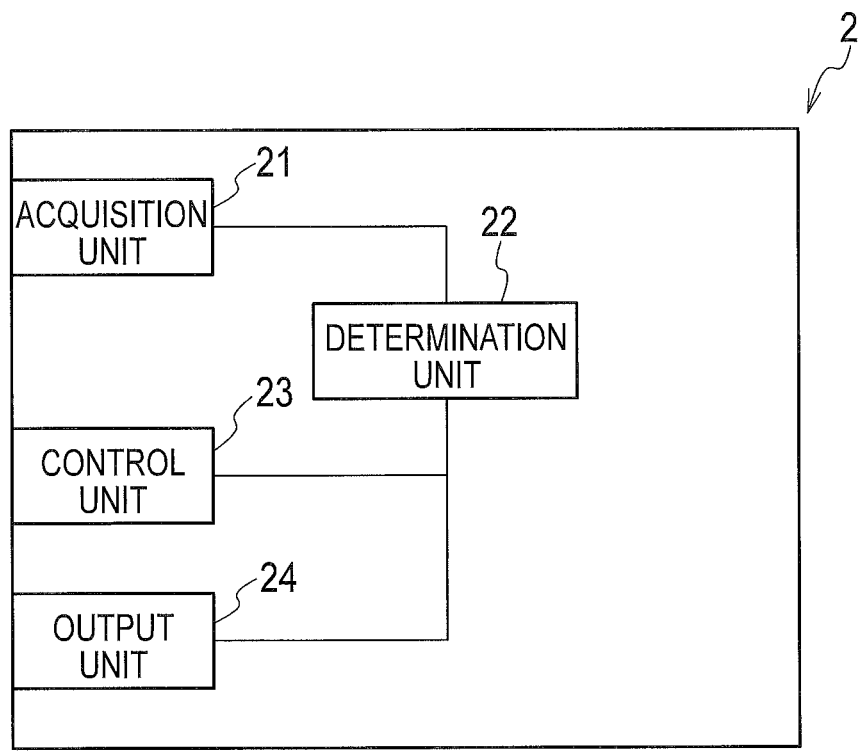
FIG. 2 is a diagram of an exemplary functional block of a robot controller according to the embodiment.

The robot controller 2 is configured to control the robot 1, and includes an acquisition unit 21, a determination unit 22, a control unit 23, and an output unit 24 as illustrated in FIG. 2.

The acquisition unit 21 is configured to be capable of acquiring the rotation angle and the torque of each of the plurality of joints $J_1$ to $J_6$.

For example, the acquisition unit 21 may be configured to detect and acquire the rotation angle of each of the plurality of joints $J_1$ to $J_6$, using an encoder or a resolver, or may be configured to calculate and acquire the rotation angle of each of the plurality of joints $J_1$ to $J_6$ based on each rotation angle of actuators (not illustrated) that individually drive the plurality of joints $J_1$ to $J_6$, and the reduction ratio of a speed reducer (not illustrated).

Alternatively, the acquisition unit 21 may be configured to detect the torque at the rotation axis of each of the plurality of joints $J_1$ to $J_6$, so as to calculate and acquire the rotation angle of each of the plurality of joints $J_1$ to $J_6$ based on the torque.

The acquisition unit 21 may be configured to detect the torque at the rotation axis of each of the plurality of joints $J_1$ to $J_6$ based on torque sensors each provided to the plurality of joints $J_1$ to $J_6$.

Alternatively, the acquisition unit 21 may be configured to detect the torque at the rotation axis of each of the plurality of joints $J_1$ to $J_6$ based on the output torque or the current value of each of the actuators that individually drive the plurality of joints $J_1$ to $J_6$, and the reduction ratio of the speed reducer, or may be configured to detect the torque at the rotation axis of each of the plurality of joints $J_1$ to $J_6$ based on a different method.

The determination unit 22 is configured to determine whether the robot 1 has been in proximity to the singular configuration, based on the rotation angle of each of the plurality of joints $J_1$ to $J_6$, acquired by the acquisition unit 21.

The control unit 23 is configured to control a plurality of the joints $J_2$ and $J_3$ to be rotated, not to rotate simultaneously when the determination unit 22 determines that the robot 1 has been in proximity to the singular configuration.

That is, the control unit 23 is configured to control the plurality of the joints to be rotated, to rotate on a one-by-one basis when the determination unit 22 determines that the robot 1 has been in proximity to the singular configuration.

Here, the control unit 23 is configured to be capable of determine the joints to be rotated on the one-by-one basis when the determination unit 22 determines that the robot 1 has been in proximity to the singular configuration.

Figure 3:
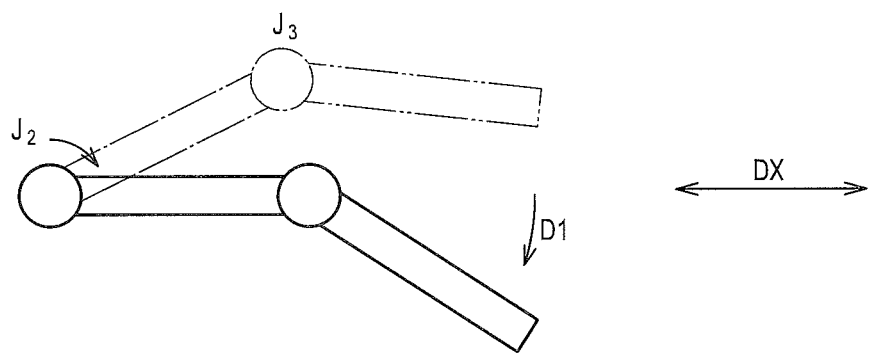
FIG. 3 is a view of an exemplary operation of a robot according to the embodiment.
Figure 4:
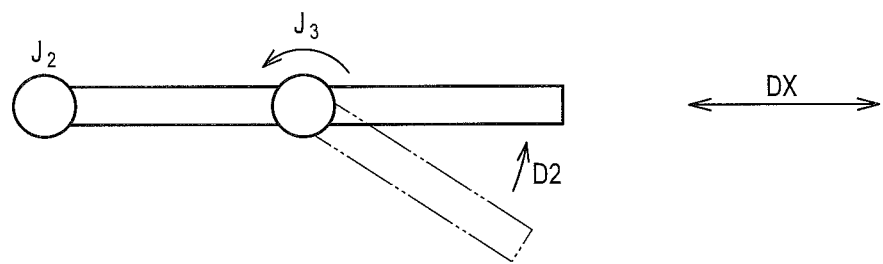
FIG. 4 is a view of another exemplary operation of the robot according to the embodiment.

For example, when the determination unit 22 determines that the robot 1 has been in proximity to the singular configuration, the control unit 23 is configured to rotate the joint $J_2$ in operation direction D1 as illustrated in FIG. 3, and then rotate the joint $J_3$ in operation direction D2 as illustrated in FIG. 4.

According to the configuration, in a case where the robot 1 has been in proximity to the singular configuration, the plurality of the joints (the joints $J_2$ and $J_3$ in FIGS. 3 and 4) rotates on the one-by-one basis so that the power in the operation direction Dx that cannot be calculated, is not generated at the tool center point P of the robot 1. Therefore, the power generated at the tool center point P of the robot 1 can be calculated.

Meanwhile, the control unit 23 is configured to be capable of rotating the plurality of the joints $J_2$ and $J_3$ simultaneously when the determination unit 22 determines that the robot 1 has not been in proximity to the singular configuration.

According to the configuration, in a state where the robot 1 has not been in proximity to the singular configuration, the plurality of the joints $J_2$ and $J_3$ rotates simultaneously so that the work efficiency of the robot 1 can improve.

The control unit 23 may be configured to determine the order of rotating the plurality of the joints (the joints $J_2$ and $J_3$ in FIGS. 3 and 4) in response to the instruction of a user.

According to the configuration, the arm of the robot 1 can be manipulated along an orbit convenient for the user, in consideration of, for example, a jig arranged on the periphery of the robot 1.

The control unit 23 may previously sets the order of rotating the plurality of the joints (the joints $J_2$ and $J_3$ in FIGS. 3 and 4), and when the determination unit 22 determines that the robot 1 has been in proximity to the singular configuration, the control unit 23 may determine the order of rotating the plurality of the joints (the joints $J_2$ and $J_3$ in FIGS. 3 and 4) in accordance with the setting.

The control unit 23 may be configured to vary conditions for determining that the robot 1 has been in proximity to the singular configuration, in response to the instruction of the user.

The conditions may be prescribed with the position and the angle of each of the joints $J_1$ to $J_6$. For example, when the position and the angle of each of the joints $J_1$ to $J_6$ become a predetermined position and a predetermined angle, respectively, the determination unit 22 may determine that the robot 1 has been in proximity to the singular configuration.

According to the feature, the range of determining that the robot 1 has been in proximity to the singular configuration is varied in response to various states, so that further securely ensuring that the power generated at the tool center point P of the robot 1 is the designated value or less, can be made.

The control unit 23 may be configured to stop the control of rotating the plurality of the joints on the one-by-one basis, in response to the instruction of the user. That is, when stopping the control, the control unit 23 may be configured to control the plurality of the joints to be rotated, to rotate simultaneously even when the determination unit 22 determines that the robot 1 has been in proximity to the singular configuration.

According to the feature, in a case where the robot 1 has not been in cooperation with the human, the robot 1 can perform a normal operation so that the operation speed of the robot 1 can be accelerated.

Furthermore, the control unit 23 may be configured to vary the conditions for determining that the robot 1 has been in proximity to the singular configuration, in response to the rotation speed of each of the plurality of joints $J_1$ to $J_6$. The acquisition unit 21 may be configured to acquire the rotation speed of each of the plurality of joints $J_1$ to $J_6$.

According to the feature, when the rotation speed of each of the plurality of joints $J_1$ to $J_6$ is fast, the range of determining that the robot 1 has been in proximity to the singular configuration, is expanded so that further securely ensuring that the power generated at the tool center point P of the robot 1 is the designated value or less, can be made.

The output unit 24 is configured to output an alarm when the determination unit 22 determines that the robot 1 has been in proximity to the singular configuration, and additionally when the plurality of the joints $J_2$ and $J_3$ rotates simultaneously. The output unit 24 may be configured to output the alarm when unusual torque is generated at each of the plurality of joints $J_1$ to $J_6$.

The control unit 23 may be configured to control the operation of the robot 1 to stop when the output unit 24 outputs the alarm. In this case, the control unit 23 may be configured to restore the operation of the robot 1 based on the instruction of the user.

According to the configuration, when the determination unit 22 determines that the robot 1 has been in proximity to the singular configuration and additionally when the plurality of the joints $J_2$ and $J_3$ rotates simultaneously, the operation of the robot 1 is stopped so that the cooperation between the robot 1 and the human can be further securely achieved.

An exemplary operation of the robot controller 2 that controls the robot 1, according to the present embodiment will be described below with reference to FIG. 5.

Figure 5:
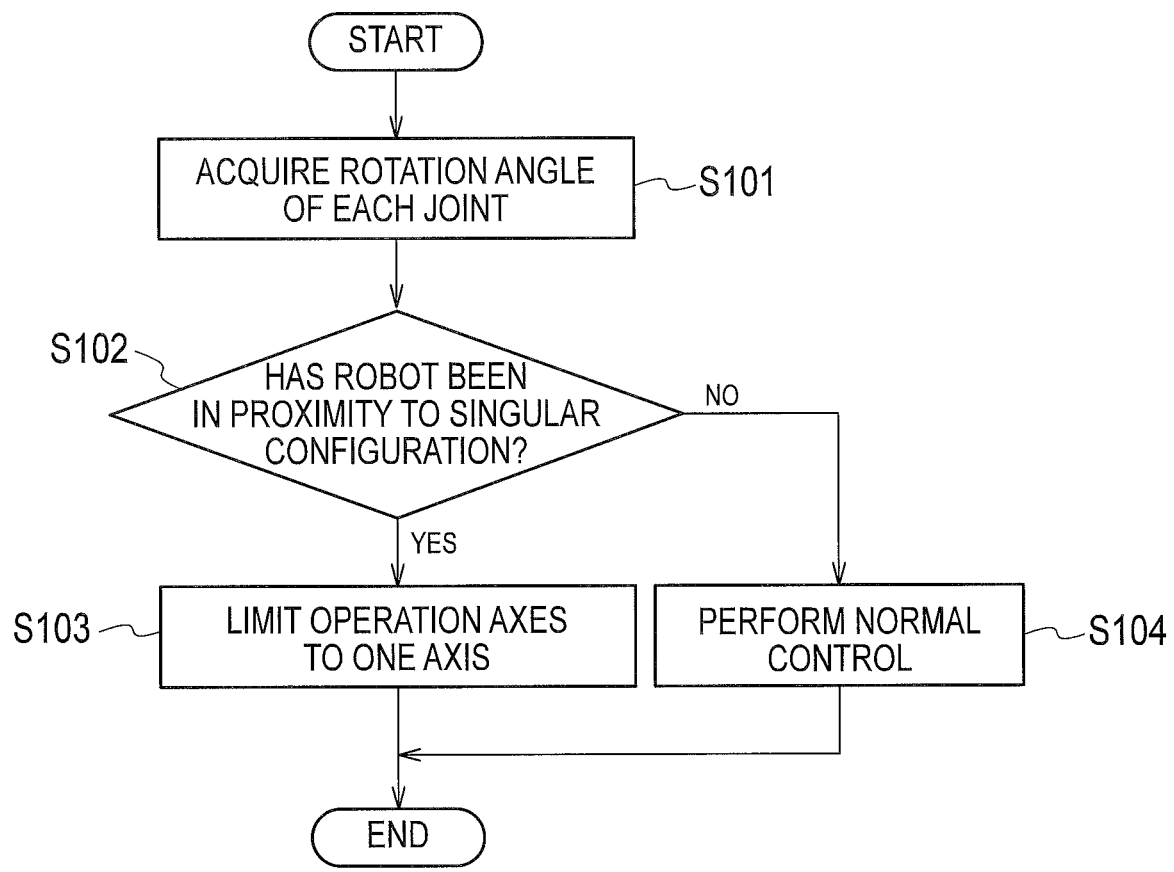
FIG. 5 is a flow chart of exemplary robot control method according to the embodiment.
Figure 6:
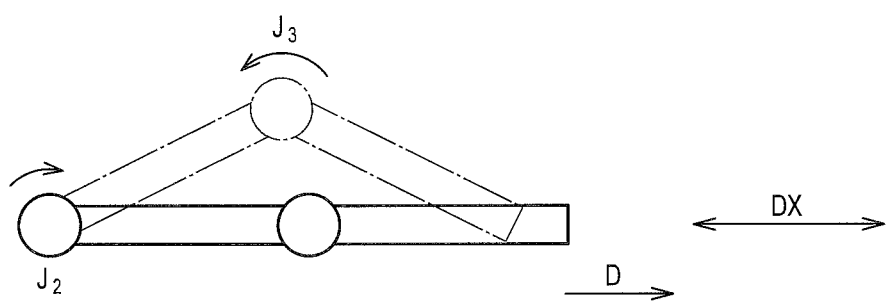
FIG. 6 is a view of an exemplary operation of a conventional robot.

As illustrated in FIG. 5, the robot controller 2 acquires the rotation angle of each of the plurality of joints $J_1$ to $J_6$ at step S101 and determines whether the robot 1 has been in proximity to the singular configuration, based on the rotation angle of each of the plurality of joints $J_1$ to $J_6$ at step S102.

When the determination unit 22 determines that the robot 1 has been in proximity to the singular configuration, the present operation proceeds to step S103. When the determination unit 22 determines that the robot 1 has not been in proximity to the singular configuration, the present operation proceeds to step S104.

The robot controller 2 controls the plurality of the joints to be rotated, to rotate on the one-by-one basis (namely, controls the plurality of the joints not to rotate simultaneously) at step S103, and controls the plurality of the joints to be rotated, to rotate simultaneously, namely, performs the normal control at step S104.

The robot system 100 according to the present embodiment, can ensure that the power in the operation direction Dx generated at the tool center point P of the robot 1 is the designated value or less, even in a case where the robot 1 has been in the singular configuration.

It should be understood by those skilled in the art that various modifications, combinations, sub-combinations and alterations may occur depending on design requirements and other factors insofar as they are within the scope of the appended claims or the equivalents thereof.

What is claimed is:

1. A robot controller configured to control a robot including a plurality of joints each rotatable around a rotation axis, the robot controller comprising:
    an acquisition unit configured to acquire a rotation angle of each of the plurality of joints;
    a determination unit configured to determine whether or not the robot has been in proximity to a singular configuration at a singularity of the robot, based on the rotation angle of each of the plurality of joints, the determination unit determining that the robot has been in proximity to the singular configuration when at least one of a position and an angle of the plurality of joints are at a predetermined position and a predetermined angle, respectively; and
    a control unit configured to control the plurality of joints to be rotated not to rotate simultaneously, when the determination unit determines that the robot has been in proximity to the singular configuration.

2. The robot controller according to claim 1, wherein
    the control unit is configured to rotate the plurality of joints simultaneously, when the determination unit determines that the robot has not been in proximity to the singular configuration.

3. The robot controller according to claim 1, further comprising:
    an output unit configured to output an alarm, when the determination unit determines that the robot has been in proximity to the singular configuration and when the plurality of joints rotates simultaneously.

4. The robot controller according to claim 2, further comprising:
    an output unit configured to output an alarm, when the determination unit determines that the robot has been in proximity to the singular configuration and when the plurality of joints rotates simultaneously.

5. The robot controller according to claim 1, wherein
    the acquisition unit is configured to detect torque of each of the plurality of joints, and to acquire the rotation angle of each of the plurality of joints based on the torque.

6. The robot controller according to claim 1, wherein
    the control unit is configured to determine an order of rotating the plurality of joints in response to an instruction of a user.

7. The robot controller according to claim 1, wherein
    the control unit is configured to vary conditions for determining that the robot has been in proximity to the singular configuration, in response to the instruction of the user.

8. The robot controller according to claim 1, wherein
    the control unit is configured to stop control of rotating the plurality of joints on a one-by-one basis, in response to the instruction of the user.

9. The robot controller according to claim 1, wherein
    the control unit is configured to vary conditions for determining that the robot has been in proximity to the singular configuration, in response to a rotation speed of each of the plurality of joints.

10. A robot control method of controlling a robot having a plurality of joints each rotatable around a rotation axis, the robot control method comprising:
    acquiring a rotation angle of each of the plurality of joints using an encoder or a resolver;
    determining whether or not the robot has been in proximity to a singular configuration at a singularity of the robot, based on the rotation angle of each of the plurality of joints, the determination being that the robot has been in proximity to the singular configuration when at least one of a position and an angle of the plurality of joints are at a predetermined position and a predetermined angle, respectively; and
    controlling the plurality of joints to be rotated not to rotate simultaneously, when the determining determines that the robot has been in proximity to the singular configuration.

* * * * *

(12) SUPPLEMENTAL EXAMINATION CERTIFICATE

United States Patent
Shikina et al.

(10) Number: US 10,377,038 F1
(45) Certificate Issued: Apr. 20, 2020

Control No.: 96/000,315

Filing Date: Mar. 10, 2020

Primary Examiner: My Trang Ton

No substantial new question of patentability is raised in the request for supplemental examination. See the Reasons for Substantial New Question of Patentability Determination in the file of this proceeding.

(56) Items of Information

FOREIGN PATENT DOCUMENTS

| | | |
|---|---|---|
| JP | 2003-311664-A | 11/05/2003 |
| JP | 2005-230952-A | 09/02/2005 |
| JP | 2015-202537-A | 11/16/2015 |
| JP | H11-226884-A | 08/24/1999 |
| JP | H11-226885-A | 08/24/1999 |
| JP | H11-226886-A | 08/24/1999 |

OTHER DOCUMENTS

Third Party Observation that was submitted by a third party to the Commissioner of the Japanese Patent Office on April 4, 2019.